(12) United States Patent
Grothaus

(10) Patent No.: US 6,758,464 B2
(45) Date of Patent: Jul. 6, 2004

(54) INNERSPRING ASSEMBLY, AND METHOD OF MAKING AN INNER SPRING ASSEMBLY

(75) Inventor: Wolfgang Grothaus, Bad Essen (DE)

(73) Assignee: AGRO Federkernproduktions GmbH, Bad Essen-Wittlage (DE)

(*) Notice: Subject to any disclaimer, the term of this patent is extended or adjusted under 35 U.S.C. 154(b) by 0 days.

(21) Appl. No.: 10/437,087

(22) Filed: May 13, 2003

(65) Prior Publication Data

US 2003/0218285 A1 Nov. 27, 2003

Related U.S. Application Data

(60) Provisional application No. 60/382,980, filed on May 24, 2002.

(51) Int. Cl.$^7$ ............................................. B68G 7/054
(52) U.S. Cl. ..................................... 267/103; 267/142
(58) Field of Search .......................... 267/93, 103, 242; 5/464, 477, 655.8, 720

(56) References Cited

U.S. PATENT DOCUMENTS

| | | | | |
|---|---|---|---|---|
| 5,136,740 A | * | 8/1992 | Kraft | 5/464 |
| 5,868,383 A | * | 2/1999 | Codos | 267/80 |
| 6,318,416 B1 | * | 11/2001 | Grueninger | 5/716 |
| 6,540,214 B2 | * | 4/2003 | Barber | 267/93 |

FOREIGN PATENT DOCUMENTS

| | | |
|---|---|---|
| DE | 297 10 758 | 9/1997 |
| DE | 297 05 098 | 11/1997 |
| DE | 297 22 598 | 4/1998 |
| DE | 298 23 956 | 4/2000 |

* cited by examiner

*Primary Examiner*—Christopher P. Schwartz
(74) *Attorney, Agent, or Firm*—Henry M. Feiereisen

(57) ABSTRACT

An innerspring assembly, preferably pocketed spring core, includes a plurality of interconnected springs having a same height and arranged to form adjoining rows to provide a resting area. At least several of the rows are arranged in relation to the respectively neighboring rows offset in height.

9 Claims, 1 Drawing Sheet

INNERSPRING ASSEMBLY, AND METHOD OF MAKING AN INNER SPRING ASSEMBLY

CROSS-REFERENCES TO RELATED APPLICATIONS

This application claims the benefit of prior filed U.S. provisional Application No. 60/382,980, filed May 24, 2002, pursuant to 35 U.S.C. 119(e), the disclosure of which is incorporated herein by reference.

BACKGROUND OF THE INVENTION

The present invention relates, in general, to an innerspring assembly, and more particularly to an innerspring assembly of a type having a plurality of interconnected springs arranged to form adjoining rows of springs and to provide a resting area for a user.

Innerspring assemblies of this type, preferably pocketed spring cores, are configured to date in such a manner that the resting area, provided by the adjoining rows, is planar throughout regardless whether or not it is exposed to a load. Such conventional innerspring assemblies are, however, unsuitable to meet the demands as far as the comfort of the spring support is concerned. For one, the mattress containing the innerspring assembly should allow particular body areas to softly sink in before a firmer support becomes effective.

Although attempts were made, to provide certain softness through application of paddings, such upholstering of the mattress is still unsuitable to satisfy the demands in the broadest sense, especially since elasticity of such an upholstery is not comparable with a spring system.

German Pat. No. DE 297 22 598 U1 discloses an innerspring assembly which describes the arrangement of springs of different height in the individual rows in order to attempt to achieve an improved resting comfort. However, the use of springs of different height alters the spring characteristic and generally leads to an unsatisfactory result. Furthermore, the manufacture of such an innerspring assembly is cumbersome and difficult.

It would therefore be desirable and advantageous to provide an improved innerspring assembly to obviate prior art shortcomings and to improve the resting comfort while still keeping the manufacturing process as simple as possible.

SUMMARY OF THE INVENTION

According to one aspect of the present invention, an innerspring assembly includes a plurality of interconnected spring having a same height and arranged to form adjoining rows to provide a resting area, wherein at least several of the rows of springs are arranged in relation to the respectively neighboring rows offset in height.

As a consequence of this configuration of an innerspring assembly according to the present invention, a very sensitive spring support is realized by which the surface of the innerspring assembly has a feel of extreme softness. Protruding body areas are able to initially sink in deeper into the mattress. As soon as the relatively lower situated rows are reached, the additional spring force can support the recumbent person in an optimal manner. As a result, a progressive spring force is realized which provides a remarkable recuperation, for example of the spine. The progressive spring behavior is based on the application of a greater counterforce, as the weight increases.

The offset spring arrangement effects at the same time that the innerspring assembly is able to contour to the body in a particularly good way, thereby also contributing to an enhancement of the comfort.

According to another feature of the present invention, the springs of different rows may have varying hardness, which can be realized through respective selection of wire strength, use of different spring diameters or wire hardness. This creates the possibility to manufacture with the assistance of such an inner spring assembly a so-called reversible mattress which can optionally be used on one side or the other side.

In general, there is the option to arrange only a portion of the rows in non-offset height relationship to the neighboring rows, i.e., several rows in one plane, in relation to the user side, may be projecting or lowered to thereby establish a so-called multizone configuration which can be contoured to certain body areas, possibly in combination with differently configured springs, as described.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
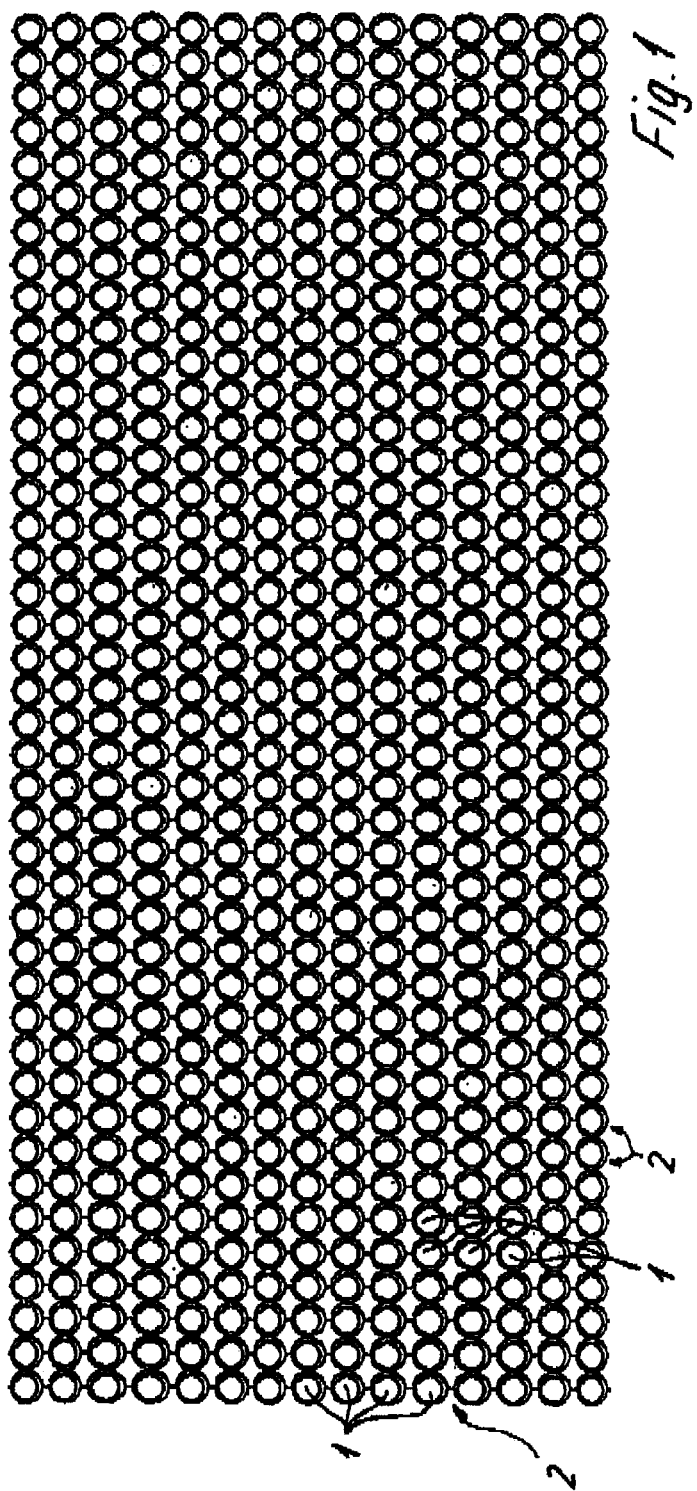
FIG. 1 is a plan view of an innerspring assembly according to the present invention.

Throughout all the Figures, same or corresponding elements are generally indicated by same reference numerals. This depicted embodiment is to be understood as illustrative of the invention and not as limiting in any way.

Turning now to the drawing, and in particular to FIG. 1, there is shown a plan view of an innerspring assembly according to the present invention, configured as a pocketed spring core and including a plurality of rows 2 of springs 1. The rows 2 extend transversely to the longitudinal axis and are disposed in side-by-side and adjoining relationships. The springs 1 of each row 2 may be constructed as barrel springs and have a same height or vertical dimension, as shown in FIG. 2, whereby each spring 1 is placed in a pocket made, preferably of textile material and enveloping the spring 1.

Figure 2:
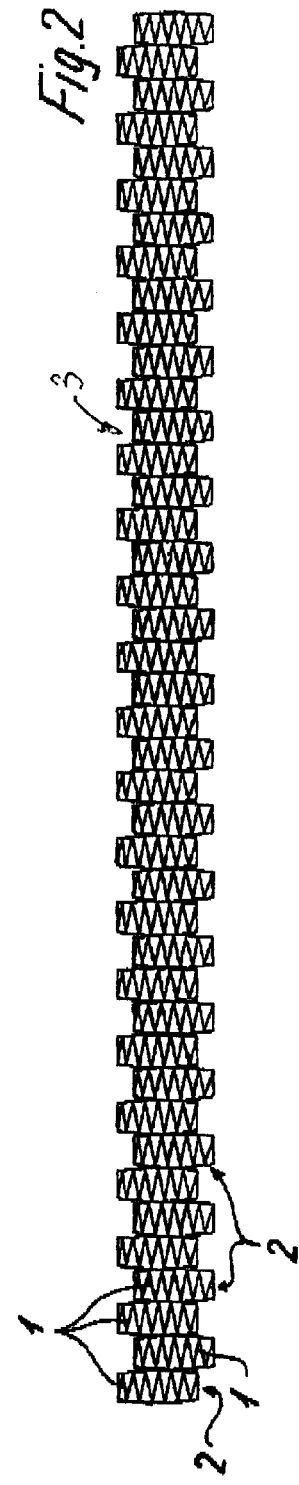
FIG. 2 a side view of the innerspring assembly of FIG. 1.

In the non-limiting embodiment of the inner spring assembly, as shown in FIG. 2, the rows 2 are arranged in alternating fashion offset in height in relation to the respectively neighboring row 2, whereby the same height of all springs 1 results in the formation of a depression 3 between elevated rows 2 in the absence of a load upon the innerspring assembly.

When a person lies of the innerspring assembly, the elevated or projecting rows 2 are initially depressed to thereby effect a very soft feel and to enable protruding body portions to sink in into the innerspring assembly. Only when the respective springs 1 of the elevated rows 2 have been compressed far enough to a level of the lower or deeper situated rows 2, disposed in offset relationship to the elevated rows 2, are the body portions of the person fully supported, while other elevated rows 2 of springs 1 that have not yet been compressed as deeply remain in elevated disposition.

Of course, instead of a continuous alternation of an elevated and a lower row, as shown in FIG. 2, the innerspring assembly may also be constructed, for example, with two elevated rows 2 in side-by-side relationship which a respective lower row 2 positioned adjacent thereto.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents.

What is claimed is:

1. An innerspring assembly, comprising a plurality of interconnected springs having a same vertical dimension and arranged to form adjoining rows to provide a resting area, wherein at least several of the rows of said springs are arranged in relation to neighboring ones of the rows offset in a vertical direction.

2. The innerspring assembly of claim 1, wherein each of the springs is in pocket to form a pocketed spring core.

3. The innerspring assembly of claim 1, wherein each of the rows is placed in a vertically offset relationship to a neighboring one of the rows.

4. The innerspring assembly of claim 1, wherein the rows offset to the neighboring rows have a different hardness than the neighboring rows.

5. The innerspring assembly of claim 4, wherein the springs of the offset rows have in relation to the springs of the neighboring rows at least one of different wire strength, different diameter, and different wire hardness.

6. The innerspring assembly of claim 1, wherein several adjoining rows are disposed in offset relationship to adjacent ones of the rows.

7. An innerspring assembly comprising a plurality of interconnected springs lined up to form adjoining rows, whereby the rows of springs are arranged offset in height to effect a progressive spring force in response to a user's weight, wherein the plurality of springs have a same vertical dimension.

8. An innerspring assembly, comprising a plurality of interconnected springs constructed of same vertical dimension and lined up to form first and second pluralities of rows of springs, whereby the first plurality of rows is arranged vertically offset to the second plurality of rows to define depressed and elevated areas.

9. A method of making an innerspring assembly, comprising the steps of:

lining up a first plurality of rows of springs; and interconnecting the first plurality of rows of springs with a second plurality of rows of springs of a same vertical dimension as the first plurality of rows of springs, such that the first plurality of rows and the second plurality of rows are placed in vertical offset relationship.

* * * * *